United States Patent [19]
Grant et al.

[11] 3,920,897
[45] Nov. 18, 1975

[54] ELECTRIC PULSE TRAIN GENERATORS AND FREQUENCY SYNTHESISERS

[75] Inventors: James Grant, Northampton; Clive Rowland Warburton, Coventry, both of England

[73] Assignee: The General Electric Company Limited, London, England

[22] Filed: Apr. 24, 1974

[21] Appl. No.: 463,777

[30] Foreign Application Priority Data

Apr. 25, 1973 United Kingdom............... 19600/73

[52] U.S. Cl...................... 178/66 R; 325/30; 328/62
[51] Int. Cl.²........................................... H04L 27/10
[58] Field of Search............. 328/17, 39, 41, 48, 62; 178/66 R; 325/30, 320

[56] References Cited

UNITED STATES PATENTS

| | | | |
|---|---|---|---|
| 3,184,663 | 5/1965 | Mergler | 328/41 |
| 3,713,017 | 1/1973 | Vena | 178/66 R |
| 3,773,975 | 11/1973 | Koziol | 178/66 R |

*Primary Examiner*—George H. Libman
*Attorney, Agent, or Firm*—Kirschstein, Kirschstein, Ottinger & Frank

[57] ABSTRACT

A pulse train generator arrangement in which a required pulse repetition rate is achieved by selection of one or more of a plurality of interlaced trains of pulses of different repetition rates and by selective cancellation of some of the pulses in the selected trains. In a voice-frequency tone signalling system for example two tones of differing frequencies are obtained using such a generator arrangement by selectively subtracting by cancellation a pulse train of a relatively low repetition rate from a pulse train of higher repetition rate followed by repetition rate division and filtering.

14 Claims, 5 Drawing Figures

ELECTRIC PULSE TRAIN GENERATORS AND FREQUENCY SYNTHESISERS

Figure 1:
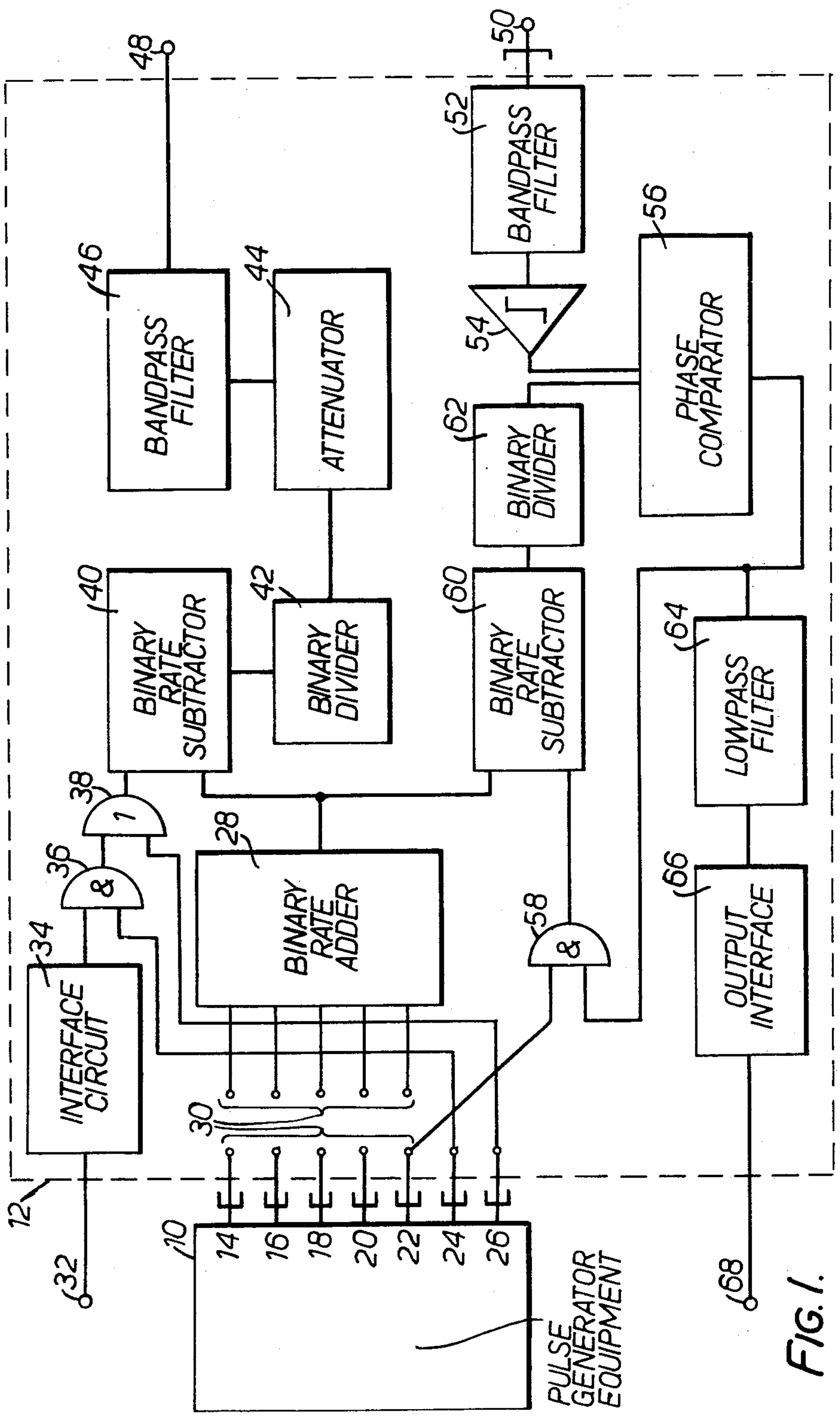

This invention relates to electric pulse train generators and frequency synthesisers. This invention is also concerned with the application of such pulse train generators and frequency synthesisers to transmitter and/or receiver terminal apparatus for frequency shift keyed telegraphy systems.

According to one aspect of the invention, an electric pulse train generator for generating a train of electric pulses having a controllably variable average pulse repetition rate, comprises generating means to generate a plurality of electric pulse trains each having a different repetition rate, no pulse in any of these generated trains being coincident with a pulse in any other train, combining means for combining a first predetermined selection of the generated pulse trains to form a first combined pulse train having an average pulse repetition rate equal to the sum of the pulse repetition rates of the selected pulse trains, cancelling means for cancelling from the first combined pulse train one pulse in respect of each pulse in a second predetermined selection of the generated pulse trains to form a second combined pulse train which is the output of the pulse generator and whose average pulse repetition rate can be controlled by changing the second predetermined selection.

Adjacent pulse repetition rates of the plurality of electric pulse trains are preferably related by a factor of two, such that they may be generated by a succession of divisions-by-two of a pulse train having a suitably high repetition rate.

Where the second selection is the same as or contained within the first selection, the cancelling means preferably functions by contemporaneous mutual cancellation of pulses in the first combined pulse train and pulses in the second selection of pulse trains. Where the second selection contains one or more pulse trains not in the first selection, the cancelling means preferably functions by cancelling the next following pulse in the first combined pulse train after the occurrence of a pulse in the second selection where that pulse occurs in a pulse train not in the first selection, and by contemporaneous mutual cancellation as described above if that pulse in the second selection is in a pulse train which is also in the first selection.

Preferably the average pulse repetition rate of the second combined pulse train is many times greater than the final desired repetition rate, and the pulse generator contains pulse repetition rate division means to divide the repetition rate of the second combined pulse train by a fixed division ratio to produce the output pulse train whereby pulses in this output pulse train occur more regularly than they might have done in the second combined pulse train.

The combining means may comprise an OR gate.

According to another aspect of the invention a frequency synthesiser for synthesising a controllably variable frequency sinusoidal or near sinusoidal signal comprises a pulse train generator as defined above, including filter means for filtering out the fundamental frequency from the second combined pulse train or an output pulse train derived therefrom.

According to a further aspect of the invention, transmitter terminal apparatus for a frequency shift keyed telegraphy system in which information is transmitted as at least two alternate tones of different frequencies comprises a pulse train generator as hereinbefore defined, including means for controlling the second selection such that pulse repetition rate of the output of the pulse train generator is equal to the frequency of the instantaneously required tone. The apparatus may include filter means to filter the required tone out of the pulse train output of the generator.

According to a still further aspect of the invention, receiver terminal apparatus for a frequency shift keyed telegraphy system in which information is received as at least two alternate tones of different frequencies, comprises a pulse train generator as hereinbefore defined, comparison means for comparing the relative phases of the received tone (or of a signal derived therefrom) and of the output of the pulse generator (or of a signal derived therefrom) and for deriving a control signal from this comparison, this control input being utilised to control said second selection so that the pulse train generator is phase-locked to the received tone and the value of the control signal is a measure of the frequency of the received tone and hence of said information.

Preferably the receiver terminal apparatus includes means to square the received tones to form respective pulse trains which constitute said signals derived from the tones, the pulse repetition rates of the pulse train generator outputs are substantial multiples of the tone frequencies and are divided down by a fixed ratio to rates which are controlled to be respectively lower than the rate of the lower of said pulse trains derived from the received tones or higher than the rate of the higher of said pulse trains derived from the received tonesl and the output of the comparator is low-pass filtered to derive said control signal.

If the telegraphy systems are identical, and the transmitted and received tones are the same two or more frequencies, the transmitter terminal apparatus may be combined with these parts of the respective pulse train generators apart from the cancelling means common to both the transmitter and receiver parts of the combined apparatus.

Embodiments of the invention will now be described by way of example with reference to the accompanying drawings, FIG. 1 is a block schematic diagram of one embodiment, and FIGS. 2 to 5 show in greater detail parts of the embodiment shown in FIG. 1.

The embodiments are described in the context of a twentyfour channel telegraph system employing frequency shift keying at voice frequencies, in accordance with CCITT standard R35.

Referring now to FIG. 1, this illustrates equipment 10 which is common to all channels, and equipment 12 which serves one channel only. The equipment for each channel is identical, and so only one channel equipment (12) is described below. The arrangement by which the appropriate channel frequencies are obtained will be subsequently explained in detail.

Figure 2:
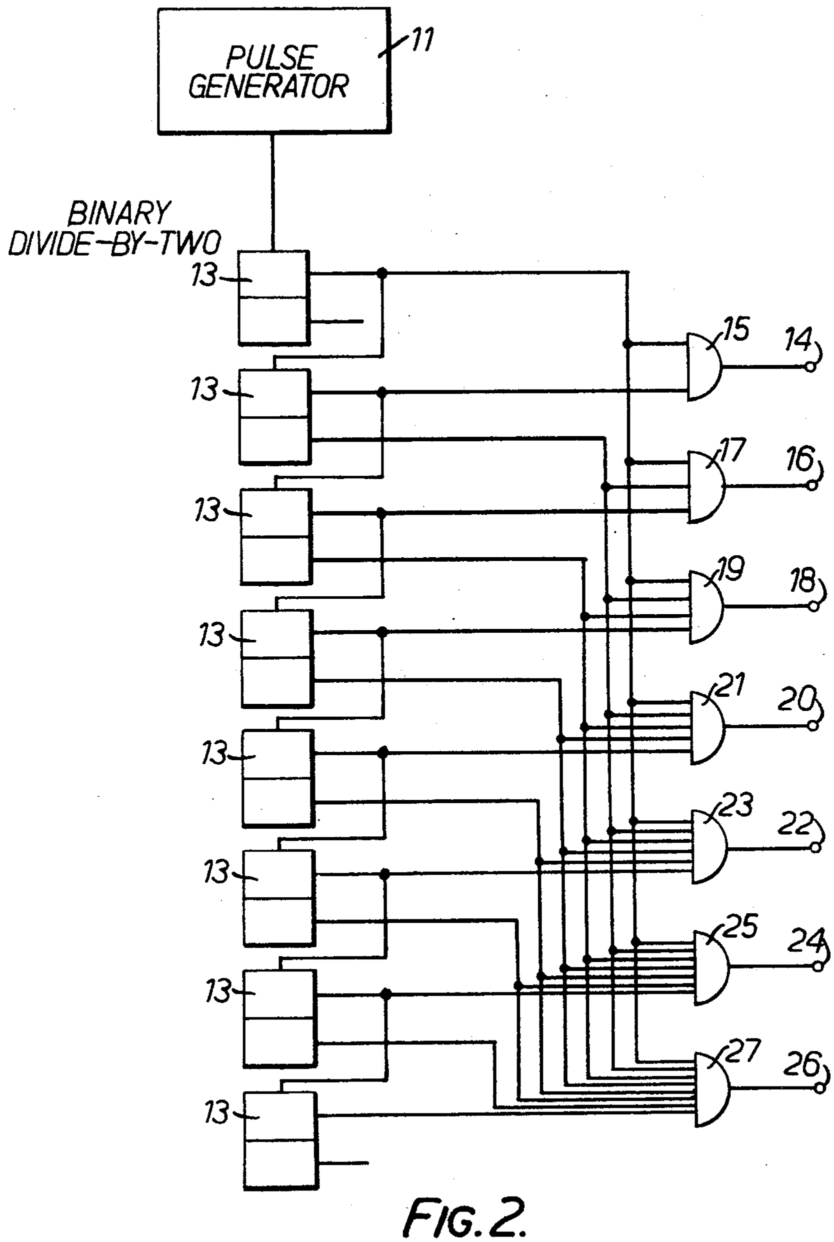

Referring also to FIG. 2, the equipment 10 comprises a pulse generator 11 which generates a pulse train having a pulse repetition rate of 3,932,160 per second which is applied to the first of eight divide-by-two stages 13 connected in cascade. Each of these stages 13 has an "in phase" and an "inverted" output, the in phase output of each of the first seven stages 13 is connected to the input of the next successive stage 13, and the in phase output of each of the last seven stages 13 is connected to a respective one of outputs 14 to 26 of the equipment 10 by way of respective AND gates 15 to 27. The outputs 14 to 26 are common to all channel equipments. The output 14 therefore provides a pulse train having a pulse repetition rate of 983,040 per second or 1920 $\times 2^9$ per second. The outputs 16 to 26 provide pulse trains which have repetition rates each half of the repetition rate of the preceding output. Thus the pulse repetition rate of the pulse train provided by the output 16 is 960 $\times 2^9$ per second, that of the output 18 is 480 $\times 2^9$ per second, that of the output 20 is 240 $\times 2^9$ per second, that of the output 22 is 120 $\times 2^9$ per second, that of the output 24 is 60 $\times 2^9$ per second, and that of the output 26 is 30 $\times 2^9$ per second. The output of the second divided stage 13 is effectively strobed by the output of the first stage 13, at the gate 15, and the pulse train at the output 18 therefore has an on/off ratio of ⅓. The in phase output of the third divider stage 13 is applied, with the inverted output of the second stage 13 and the strobing pulses from the first stage 13, to the gate 17. Similarly the succeeding gates 19 to 27 receive the in phase output from the respective stage 13, the inverted outputs from preceding stages 13 except the first, and the strobing pulses from the first stage 13, so that none of the pulses in the pulse trains provided at the outputs 14 – 26 are coincident.

In the channel equipment 12, a binary rate adder 28 is connected to selected ones of the outputs 14 to 22 by strapping together appropriate ones of the terminals 30. The outputs 22, 24 and 26 are permanently connected in each channel equipment as will subsequently be described. The binary rate adder 28 functions to add together the selected outputs from the pulse generator 10 to provide a composite pulse train whose pulse repetition rate is the sum of the pulse repetition rates of the selected outputs applied to it. Since the pulse trains provided by the pulse generator 10 have no pulses coincident, the adder 28 superimposes the pulse trains supplied to it, and so functions in like manner to an OR gate, and may therefore be constituted by an OR gate. Thus the output of the adder 28 may be selected to be a pulse train having any pulse repetition rate from 120 $\times 10^9$ to 3720 $\times 2^9$ per second, in steps of 120 $\times 2^9$ per second. It is by this selective strapping that twentyfour otherwise identical channel equipments can each produce a pulse train having a different one of twentyfour different pulse repetition rates. (Not all of the thirtytwo possible pulse trains are used since, after the procedure described below, signalling tones produced from the pulse trains at the top and bottom ends of the range of repetition rates would be outside the range of frequencies that could be carried by a normal telephone channel, i.e. from around 300 hertz to just over three kilohertz).

The process by which FSK signalling tones are derived from the above pulse train will now be described in detail.

Figure 3:
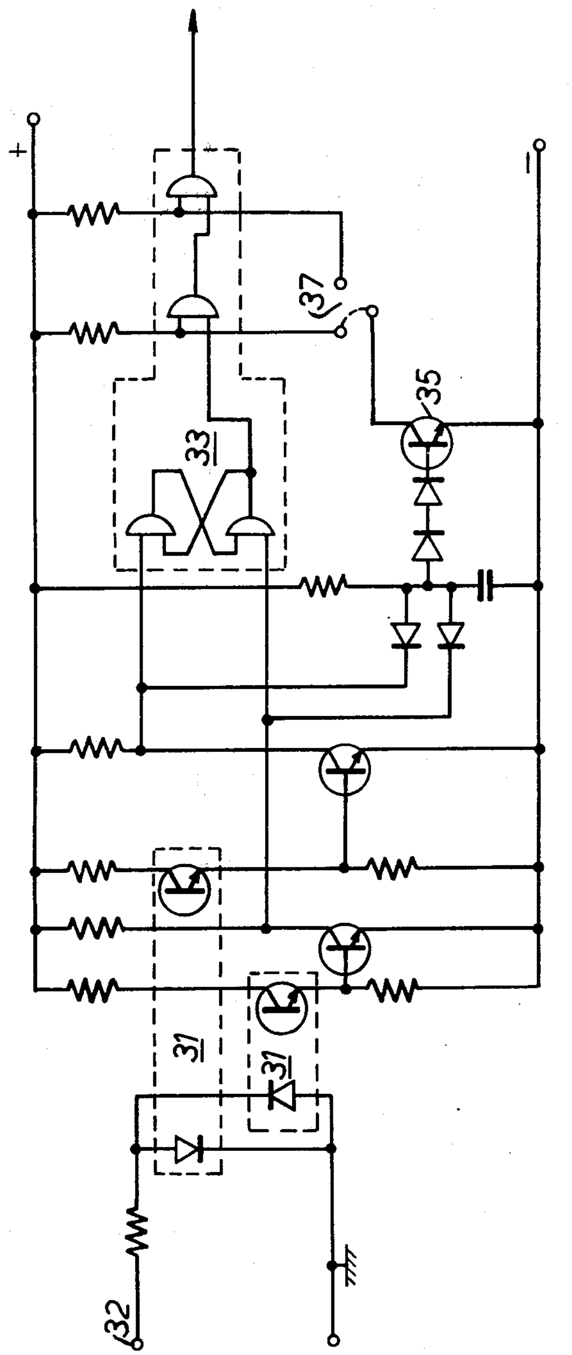
Figure 4:
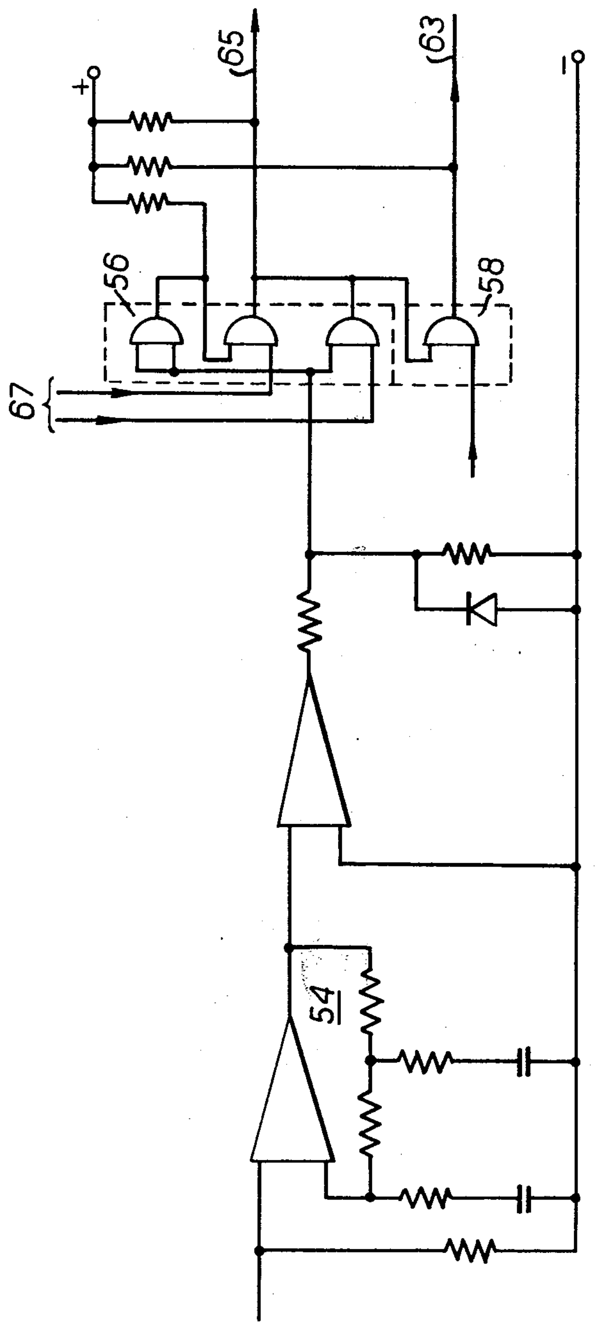
Figure 5:
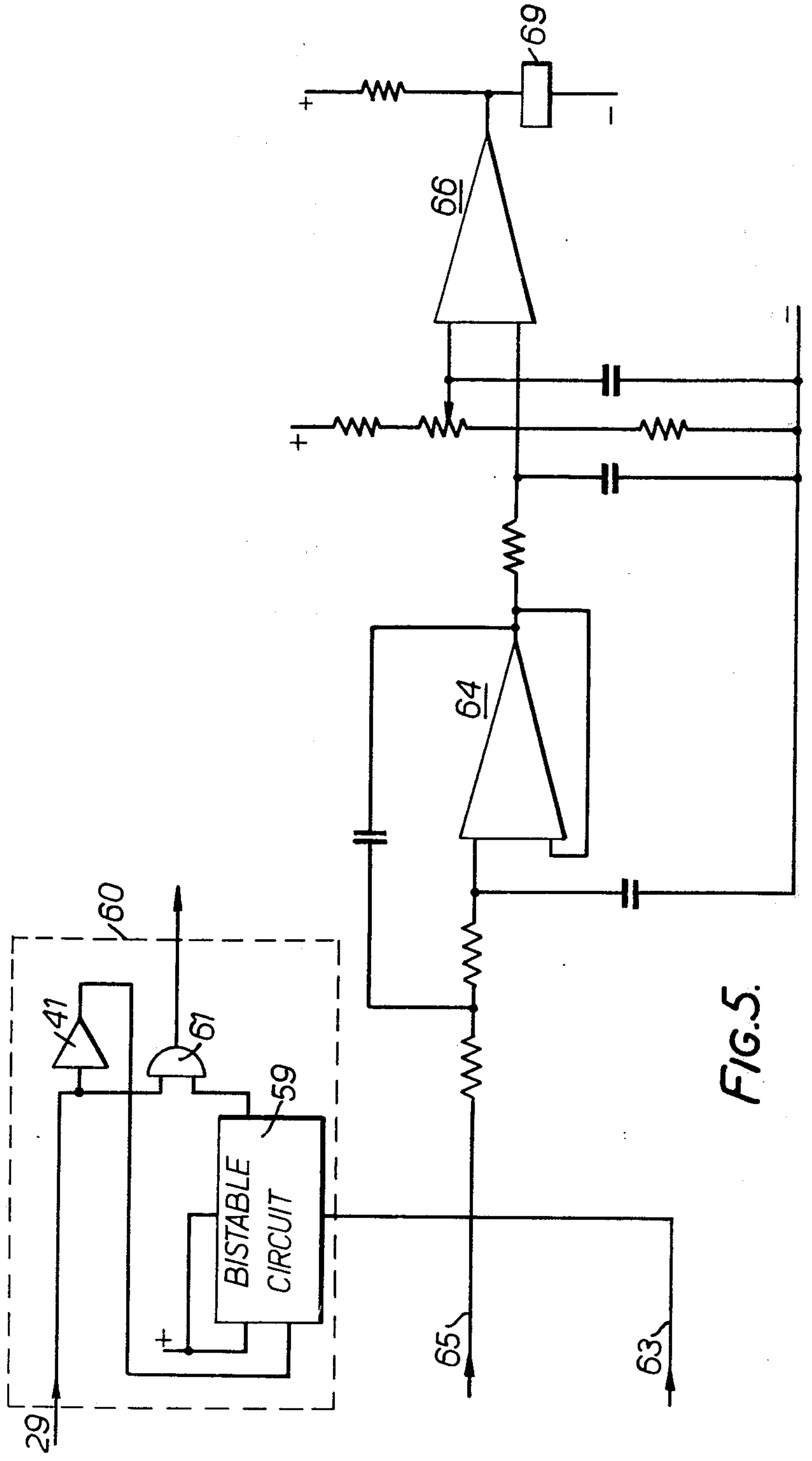

Information to be transmitted by the channel equipment 12 is received on a terminal 32, and converted in an interface circuit 34 to signal levels compatible with the output signals of the adder 28, for example voltage levels of zero or plus five volts with respect to earth depending on the logic value being represented. As shown in FIG. 3 the interface circuit 34 comprises a pair of optically coupled devices 31 which are arranged to respond to "double-current" signals of plus or minus eighty volts, say, on the terminal 32 to switch a bistable circuit 33 between its two states, and a transistor 35 which is arranged to respond in the event of signal failure at the terminal 32 to apply a fail-to-space or a fail-to-mark signal to the output of the circuit 34 in dependence upon a predetermined strapping 37.

The output of the interface circuit 34 and the output 24 of the pulse generator 10 are connected as inputs to an AND gate 36. Thus the output of the AND gate 36 is 60 $\times 2^9$ pulses per second, or no pulses according to whether the output of the interface 34 (representing the information received on the terminal 32) is a logical "one" or "nought" respectively. The output of the AND gate 36 and the output 26 of the pulse generator 10 are connected as inputs of an OR gate 38. Since the pulses from the outputs 24 and 26 are non-coincident, the output of the OR gate 38 is 90 $\times 2^9$ pulses per second or 30 $\times 2^9$ pulses per second, according to whether the output of the interface 34 is a logical "one" or "nought" respectively.

The outputs of the OR gate 38 and the binary rate adder 28 are applied to a binary rate subtracter 40 which functions as will be described to produce a pulse train having a pulse repetition rate equal to the difference in the pulse repetition rates in the pulse trains provided by the adder 28 and the OR gate 38. Thus, assuming for example that the outputs 18 and 20 are strapped to the adder 28 to produce a composite pulse train of 720 $\times 2^9$ pulses per second, the output of the subtracter 40 will be 630 $\times 2^9$ or 690 $\times 2^9$ pulses per second according to whether the output of the interface circuit 34 is a logical "one" or "nought" respectively.

Because the output of the OR gate 38 is made up of one or both of the pulse trains from the outputs 24 and 26, the output of the adder 28 is made up of one or more of the pulse trains from the outputs 14 to 22, and none of the pulse trains from the outputs 14 to 26 contain coincident pulses, the subtracter 40 cannot function by contemporaneous mutual cancellation of pulses in its two inputs. Instead, the output from the OR gate 38 sets a bistable circuit (not shown) in the subtracter 40 to cancel the next following pulse from the adder 28, and thereby effectively subtracts that pulse from the composite pulse train produced by the adder 28. Thereby the output of the subtracter 40 is the "difference" between its two inputs, i.e. one pulse train is subtracted from the other.

The output of the subtracter 40 is passed through a binary divider 42 having a division ratio of $2^9$, to produce an output of 630 or 690 pulses per second, as the case may be. The output of the divider 42 then passes through preset attenuator pad 44 and a bandpass filter 46 to produce substantially harmonic free tones of 630 or 690 hertz on an output terminal 48 which form the data transmission signal for that particular channel.

It will thus be seen how two voice frequency tones of plus or minus thirty hertz round a nominal carrier frequency of 660 hertz can be produced. By suitable strapping of the terminals 30 other pairs of frequencies can be produced at plus or minus thirty hertz frequency spacings from 120 hertz-spaced carrier frequencies.

As well as being useful for FSK telegraphy, the arrangement described above functions fundamentally as a pulse train or frequency synthesiser, and of course could be used as such in applications other than FSK telegraphy.

Part of the channel equipment 12 described above for sending data as FSK tone signals can also be used for receiving and decoding data in the form of FSK tone signals of substantially the same frequencies as used for sending. This will now be described in detail with reference to FIG. 1 and FIGS. 4 and 5.

FSK telegraphic signal tones are received on a terminal 50, and the two tones appropriate to the channel equipment 12 are filtered out in a bandpass filter 52. These tones are then converted to pulse trains having repetition rates equal to the frequencies of the received tones, i.e. 630 and 690 pulses per second in the example described above, by means of a limiting amplifier 54. The pulse train from the amplifier 54 (which in the example will be either 630 or 690 pulses per second) is fed to a phase comparator 56 as one input thereof. The derivation of the other input to the phase comparator will now be described.

The output 22 of the pulse generator 10 is supplied to an AND gate 58 together with the output of the phase comparator 56. The output of the AND gate 58 is one input of a further binary rate subtracter 60, the other input of which is the output of the adder 26. The output of the AND gate 58 is $120 \times 2^9$ pulses per second, or zero, according to whether the output of the phase comparator 56 is a logical "one" or "nought" respectively. Therefore, since the output of the adder 28 is $720 \times 2^9$ pulses per second, the output of the subtracter 60 is $600 \times 2^9$ or $720 \times 2^9$ pulses per second, respectively.

The subtracter 60, which functions identically to the subtracter 40 comprises a bistable circuit 59 and an AND gate 61, an amplifier 41 being common to both subtracters 40 and 60. Pulses from the adder 28 are applied to the AND gate 61, and the amplifier 41, by way of path 29 (FIG. 5), and so long as the bistable circuit 59 is in its reset condition these pulses pass straight on to a divider 62. Each time the bistable circuit 59 is set by a pulse from the AND gate 58 over the path 63, however, the next pulse on the path 29 is blocked by the gate 61 but subsequently resets the bistable circuit 59 by way of the amplifier 41. As the output 22 of the pulse generator 10 may be strapped to the adder 28 to produce one of the aforementioned twentyfour pulse trains, the output of the adder 28 is delayed slightly (not shown) so that the subtracter 60 can function in such a case effectively to cause mutual cancellation of "coincident pulses" in its two inputs when the output of the comparator 56 is a logical "one." The output of the subtracter 60 is passed through the binary divider 62 which has a division ratio of $2^9$, to produce an output of 600 or 720 pulses per second, as the case may be. The in phase and inverted outputs of the divided 62 are connected to the other input to the phase comparator 56, over paths 67, and it will be seen that this other input is part of a closed loop.

When the output of the amplifier 54 is 630 pulses per second, and the output of the divider 62 is (say) 600 pulses per second implying a logical "one" at the output of the comparator 56), the comparator 65 will sooner or later respond to the lagging nature of the input from the divider 62 (which is running at 30 pulses per second slower than the input from the amplifier 54), and cause its output to switch to a logical "nought." Thereupon the AND gate 58 is disabled, and the output of the divider 62 rises to 720 pulses per second, i.e. 90 pulses per second faster than the 630 pulses per second output of the amplifier 59. Eventually the comparator 56 will switch its output back to a logical "one." Assuming equal sensitivity to leading and lagging input signals, it will be seen that with the output of the amplifier 54 at 630 pulses per second, the output of the comparator 56 will switch back and forth between logical "one" and "nought," with the "one" output lasting three times as long as the "nought" output, i.e. the mark-to-space ratio of the output is three-to-one.

Conversely, with the output of the amplifier 54 at 690 pulses per second, the output of the divider 62 will be alternately 90 pulses per second slower, and 30 pulses per second faster. The output of the comparator 56 will again alternate between logical "one" and "nought," but this time the "one" output lasts one third as long as the "nought" output, i.e. the mark-to-space ratio of the output is one-to-three.

Thus the comparator 56 produces one of two different signals, according to whether the tone filtered out by the band-pass filter 52 is 630 or 690 hertz. The output of the comparator 56 is low-pass filtered in a low-pass filter 64 and applied to an output interface 66 in which a relay 69 is energised and its contacts (not shown) apply to an output terminal 68 two state signals representing the data received on the channel appropriate to the channel equipment 12.

It has already been described how a large number of different frequencies and pulse trains of different repetition rates can be produced by the same equipment, by means of selected strapping of terminals (30). Another, and very important advantage of the above invention is that, as applied to FSK telegraphy, there are no phase or amplitude distortions in the output signals when keying.

As described, the production or synthesis of various frequencies and pulse trains takes place at frequencies and pulse repetition rates much above the final desired values, with division by fixed rates down to the desired values. This has the advantage that the final frequencies or pulse trains are more regular than if production were at frequencies or repetition rates equal to the desired values, but of course if irregularities are acceptable, such relatively low frequency or low repetition rate production is possible.

By suitably altering the connections between the pulse generator 10 and the channel equipment 12, or by suitably altering the pulse repetition rates of the outputs of the pulse generator 10, FSK tone signalling can be undertaken in accordance with other CCITT standards.

The output pulse train from the adder 28 may be delayed (not shown) by an amount of the same order as the pulse length of the pulses themselves, that is, of the order of one quarter microsecond, before application to the subtracter circuits 40 and 60 to compensate for delays in the gates 36 and 38 and to ensure the correct operation of the subtracter circuits 40 and 60.

We claim:

1. An electric pulse train generator arrangement comprising generating means for generating a plurality of interlaced pulse trains each having a different repetition rate, first means for deriving from at least one of said pulse trains a first intermediate pulse train, second means selectively to pass at least one of said pulse trains in dependence upon a control signal applied thereto to form a second intermediate pulse train having a lower pulse repetition rate than said first intermediate pulse train, and subtraction means for cancelling from said first intermediate pulse train one pulse in respect of each pulse in said second intermediate pulse train to provide an output pulse train having a repetition rate equal to the difference in repetition rates between said first and second intermediate pulse trains.

2. An electric pulse train generator arrangement in accordance with claim 1 wherein said first means comprises first combining means and said first intermediate pulse train comprises a combination of at least two of said pulse trains from said generating means.

3. An electric pulse train generator arrangement in accordance with claim 2 wherein said first combining means comprises an OR gate.

4. An electric pulse train generator arrangement in accordance with claim 1 wherein said generating means comprises a pulse generator providing pulses at a high repetition rate and a succession of divide-by-two stages, and said pulse trains, having repetition rates related by factors of two, are derived from respective ones of said stages.

5. An electric pulse train generator arrangement in accordance with claim 1 wherein said subtraction means comprises a bistable circuit, means to set and bistable circuit in response to a pulse in said second intermediate pulse train, means to reset said bistable circuit in response to a pulse in said first intermediate pulse train, and output gating means to pass pulses occurring in said first intermediate pulse train to an output point only when the bistable circuit is in its reset condition.

6. An electric pulse train generator arrangement in accordance with claim 5 wherein the first intermediate pulse train is applied to said output gating means by way of a delay network.

7. An electric pulse train generator arrangement in accordance with claim 1 wherein said second means comprises first gating means selectively to pass one of said pulse trains, in dependence upon the value of a control signal, to second gating means to which is also applied at least one other of said pulse trains, the output of said second gating means forming said second intermediate pulse train.

8. An electric pulse train generator arrangement in accordance with claim 7 wherein said control signal is derived from a two-state telegraphy signal.

9. An electric pulse train generator arrangement in accordance with claim 1 wherein said output pulse train is applied to a divider circuit to derive a pulse train having a repetition rate much lower than the repetition rate of any of said pulse trains from said generating means.

10. Transmitter terminal apparatus for a frequency shift keyed telegraphy system in which information is transmitted as at least two alternate tones of different frequencies comprising a pulse train generator in accordance with claim 1 including means for controlling the second means such that pulse repetition rate of the output of the pulse train generator is equal to the frequency of the instantaneously required tone.

11. Receiver terminal apparatus for a frequency shift keyed telegraphy system in which information is received as at least two alternate tones of different frequencies, comprising a pulse train generator in accordance with claim 1, comparison means for comparing the relative phases of a signal derived from the received tone and of a signal derived from the output of the pulse generator and for deriving a control signal from this comparison, this control signal being utilised to control said second means so that the pulse train generator is phase-locked to the received tone and the value of the control signal is a measure of the frequency of the received tone.

12. Receiver terminal apparatus in accordance with claim 11 including means to square the received tones to form respective pulse trains which constitute said signals derived from the tones.

13. Receiver terminal apparatus in accordance with claim 11 wherein the pulse repetition rates of the pulse train generator outputs are substantial multiples of the tone frequencies and are divided down by a fixed ratio to rates which are controlled to be respectively lower than the rate of the lower of said signals derived from the received tones or higher than the rate of the higher of said signals derived from the received tones.

14. Receiver terminal apparatus in accordance with claim 11 wherein the output of the comparator is passed through a low-pass filter to derive said control signal.

* * * * *